United States Patent [19]

Hu

[11] Patent Number: 4,954,765
[45] Date of Patent: Sep. 4, 1990

[54] FULLY AUTOMATIC PHASE CONTROLLER FOR A NON-COIL ARMATURE TYPE GENERATOR

[76] Inventor: Long-Hai Hu, No. 9, 2 Road, Industry District, Taichung City, Taiwan

[21] Appl. No.: 372,758

[22] Filed: Jun. 29, 1989

[51] Int. Cl.$^5$ .............................................. G05F 5/00
[52] U.S. Cl. .................................. 323/217; 323/210; 323/901
[58] Field of Search ............... 323/212, 217, 218, 219, 323/238, 239, 240, 241, 300, 352, 901

[56] References Cited

U.S. PATENT DOCUMENTS

| | | | |
|---|---|---|---|
| 4,158,164 | 6/1979 | Nutz | 323/243 |
| 4,234,843 | 11/1980 | Gyugyi et al. | 323/210 |
| 4,302,716 | 11/1981 | Glavitsch et al. | 323/217 |
| 4,357,570 | 11/1982 | Schmid et al. | 323/210 |
| 4,430,607 | 2/1984 | Muth | 323/217 |
| 4,449,054 | 5/1984 | Jop | 323/217 |

Primary Examiner—Peter S. Wong
Attorney, Agent, or Firm—Bacon & Thomas

[57] ABSTRACT

A fully automatic phase controller for non-coil armature type generator includes a starting control circuit and an automatic voltage control circuit, to fully automatically control the phase according to the range of the amplitude or the forward and backward movement of a pulse train, by means of magnetic saturation using a TRIAC and a voltage stabilizer. According to the present invention, the controller is very compact and inexpensive to manufacture, which helps to provide a stable voltage while the phase is fully automatically controlled.

2 Claims, 3 Drawing Sheets

FIG. I
PRIOR ART

FULLY AUTOMATIC PHASE CONTROLLER FOR A NON-COIL ARMATURE TYPE GENERATOR

BACKGROUND OF THE INVENTION

1. Field of the Invention

The present invention is to provide a compact, fully automatic phase controller for a non-coil armature type generator, to fully, automatically perform voltage, electric current and phase control processes.

2. Description of the Related Art

A known phase controller, as shown in FIG. 1, includes Relay RY to couple a Capacitor C and a Coil L to achieve phase control. This kind of conventional phase controller is very heavy, expensive and cannot automatically control the voltage.

SUMMARY OF THE INVENTION

The main objective of the present invention is to provide a fully automatic phase controller for a non-coil armature-type generator, which is compact and light, inexpensive to manufacture and helps to provide a stable voltage.

According to the present invention, the controller automatically controls the phase according to the range of the amplitude or the forward and backward movement of a pulse train by means of a magnetic saturation method using a TRIAC and a voltage stabilizer.

Experimentation has shown that the present invention can provide the following advantages:

(1) Compactness: By means of the voltage stabilizer and the TRIAC, the size and weight are minimized;

(2) Cost savings: The invention minimizes component parts consumption. The component parts used are very common and expensive;

(3) Fully automatic operation: From the rotation of the rotor to the output of electric current, control is fully automatic without the need for manual operation as required in the conventional phase controller; and (4) High stability of voltage: By matching the TRIAC with the voltage stabilizer, constant voltage is obtained.

Other objects, features and advantages of the present invention will be fully understood from the following detailed description of the preferred embodiments considered in connection with the annexed drawings.

| CODES: | |
|---|---|
| Relay - RY | Capacitors - C, C1, C2, C3, C4 |
| Rotor - 10 | Stator - 20 Coil - L |
| Variable Resistors - VR, VR1, VR2 | Switch Controller - T |
| TRIAC - T1, T2, T3, T4 | Pole - L1 Voltage |
| Stabilizer - Ic1, Ic2, Ic3 | Rectifier - Re |
| Transformer - To | |

DETAILED DESCRIPTION OF THE PREFERRED EMBODIMENT

The present invention is to be used in a non-coil armature-type generator. Because the armature does not have a coil set therein, the phase current controller drives the phase current of the stator coil synchronously to produce an induced electromagnetic field to temporarily reside in the board. Through the phase current control during rotation of the armature, power generation is achieved; that is, when the rotor rotates against a stator, an electric current is induced in the coil of the stator, which current consequently drives, by means of phase control, the rotor and the stator to further change kinetic energy into electrical energy, wherein the phase control is achieved by means of the value change of the L/C ratio. Therefore, the voltage is regulated when the phase shifts. The present invention operates according to this principle, with an automatic control circuit system provided to fully perform the phase control process.

Figure 1:
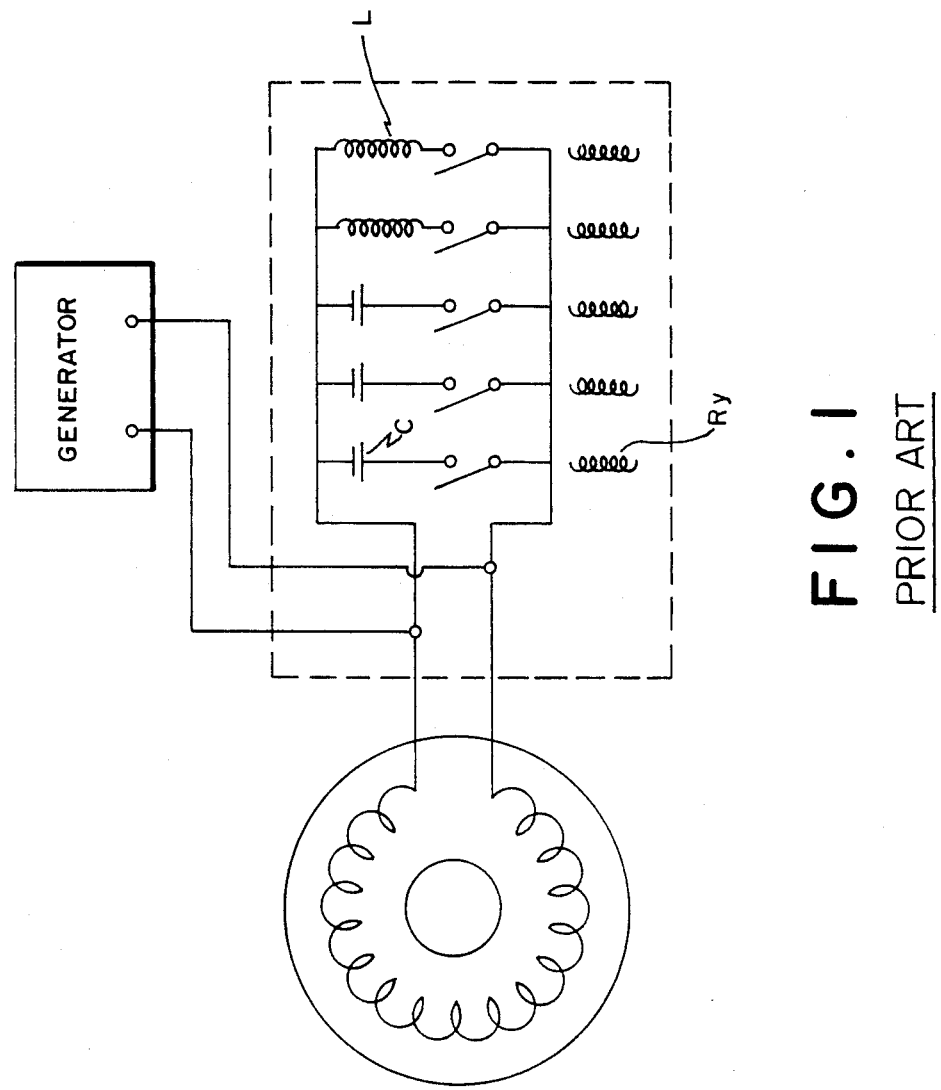
FIG. 1 is a circuit diagram of a non-coil armature-type generator phase controller according to the prior art.
Figure 2:
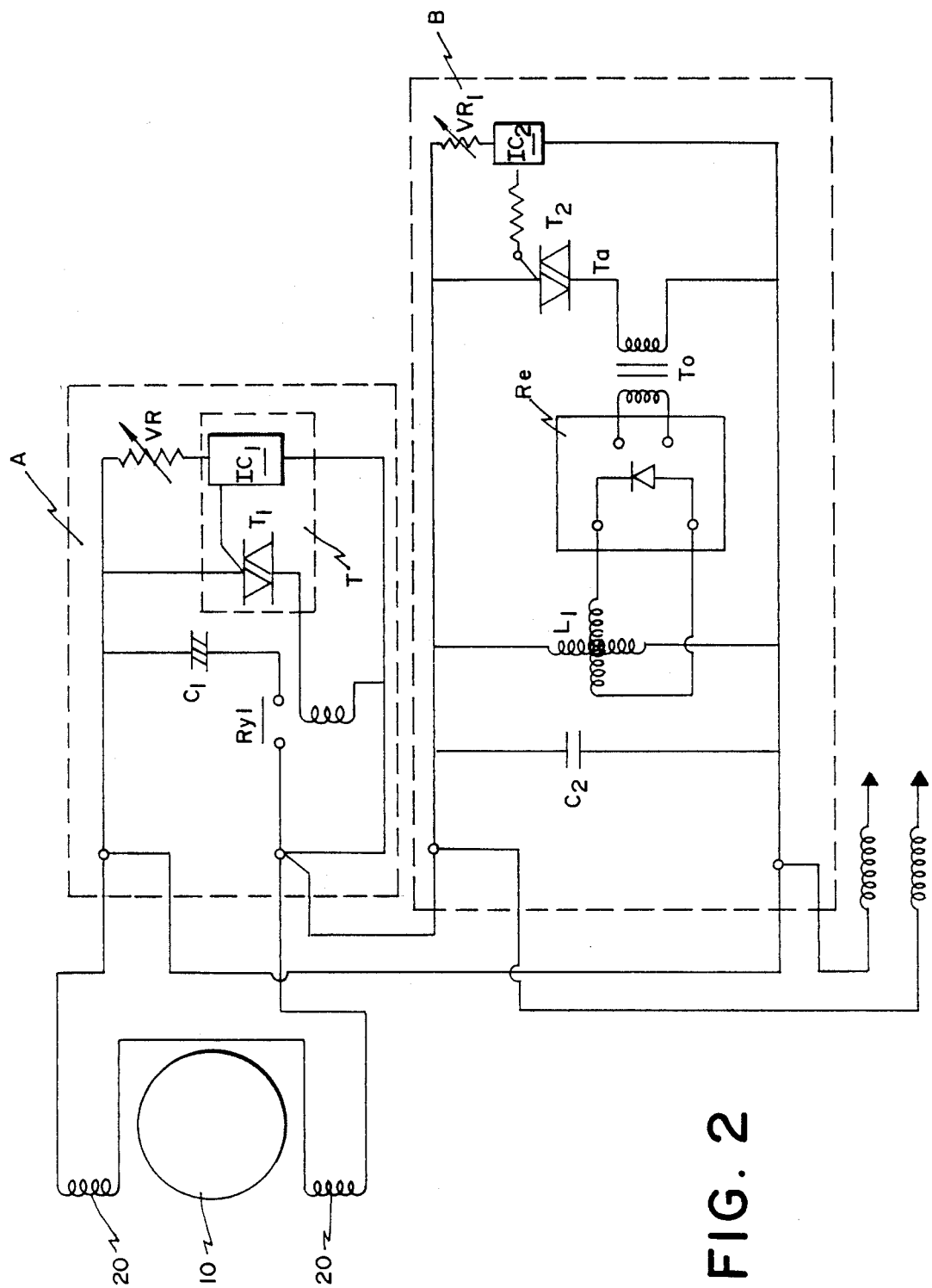
FIG. 2 is a circuit diagram of a non-coil armature-type generator phase controller according to the present invention.

With reference to FIG. 2, the inventive automatic phase controller includes starting control circuit A and an automatic voltage control circuit B.

The starting control circuit A regulates and controls the starting voltage (for 110 V, the most preferable starting voltage is $110 \times 0.707 = 80$ V). Circuit A comprises a capacitor C1, a variable resistor VR, a TRIAC switch controller T and a reed switch Ry1, wherein the TRIAC switch controller T includes a TRIAC T1 and a voltage stabilizer Ic1.

The capacitor C1 stores electric charge. The variable resistor VR1 regulates a starting voltage according to the electric current generated. The voltage stabilizer Ic1 provides the TRIAC with a constant voltage. The TRIAC T1 controls the operation of the reed switch Ry1. When a starting voltage is set through the variable resistor VR (the most preferable starting voltage for 110 V is $110 \times 0.707 = 80$ V, for 220 V is $220 \times 0.707 = 160$ V), the rotor 10 rotates and induces a current in the coil of the stator 20. When the induced current causes the voltage drop across VR to reach 90 V, the output gate signal from Ic1 triggers the TRIAC T1 to open the reed switch Ry1. Thus, regulation of the generator starting voltage is achieved.

Figure 4:
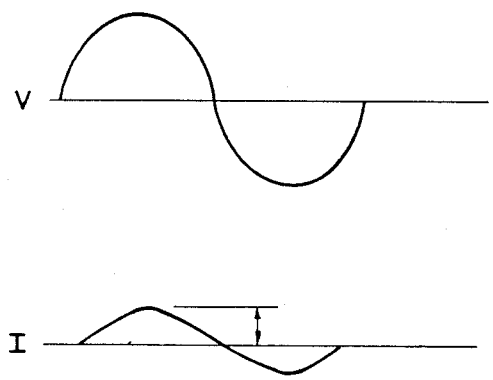
FIG. 4 is a schematic drawing illustrating the range of the amplitude in the first preferred embodiment of the invention.

The automatic voltage control circuit B controls the generator to automatically achieve the appropriate power generating voltage (110 V, 220 V, ... high voltage, etc.). Control circuit B comprises a capacitor C2, a pole L1, a rectifier Re, a transformer To, a TRIAC T2, a voltage stabilizer Ic2 and a variable resistor VR1. The capacitor C2 regulates the resonant capacitance of the L/C circuit. The pole L1 is a magnetic saturation regulator. The rectifier Re provides a DC current. The transformer To variably controls the triggering of the TRIAC T12; that is, if the frequency of the current at the load is equal to that at the gate, the phase can be adjusted, so as to guarantee a normal operation. The voltage stabilizer IC2 provides a constant voltage. The variable resistor VR1 regulates the voltage to be generated (110 V, 220 V, . . . high voltage). Therefore, after passing through starting control circuit A, the current induced in the coil of the stator 20 passes through the automatic voltage control circuit B for automatic phase control by means of magnetic saturation dependent upon the signal amplitude, as shown in FIG. 4. After phase control is automatic achieved, the electric current is regulated by the variable resistor VR1 to provide a voltage (110 V, 220 V, . . . high voltage) to the load.

Figure 3:
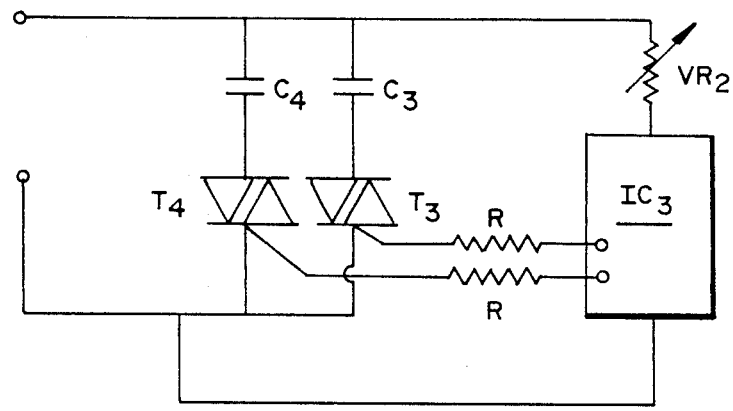
FIG. 3 is another circuit diagram of a non-coil armature-type generator phase controller according to the present invention.
Figure 5:
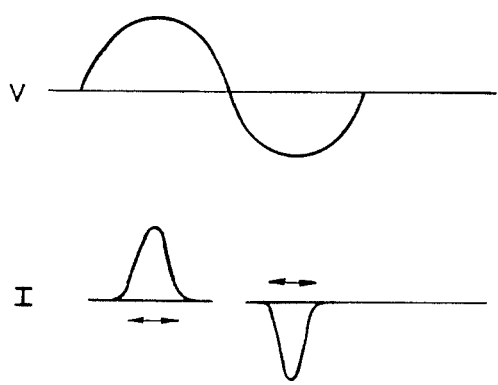
FIG. 5 is a schematic drawing illustrating the motion of the pulse in the second preferred embodiment of the present invention.

In an alternate embodiment, the automatic voltage control circuit B may be designed to automatically control the phase by means of a pulse train, as shown in FIG. 5. With reference to FIG. 3, the automatic voltage control circuit may include a variable resistor VR2, a voltage stabilizer Ic3, two sets of TRIACs T3 and T4 respectively controlled by the voltage stabilizer Ic3 and two capacitors C3 and C4 respectively connected to the pair of TRIACs T3 and T4. The voltage stabilizer Ic3 triggers the TRIACs T3 and T4 to turn on and to further provide pulse signals. Therefore, the phase can be automatically controlled by means of the forward and backward movement of the pulse signals.

While the invention has been described in connection with its preferred embodiment, it should be understood that changes and modifications can be made without departing from the scope of the appended claims.

I claim:

1. An automatic phase controller for a non-coil armature-type generator, comprising:
   a starting control circuit, including a first capacitor electrically connected between a first stator coil and a relay, a first variable resistor connected to the first stator coil for setting a desired starting voltage, a first TRIAC switch controller comprising a first TRIAC electrically connected between said first stator coil and the control terminal of said relay and a first voltage stabilizer arranged to trigger said first TRIAC when the voltage across said first variable resistor reaches said desired starting voltage, whereby said first TRIAC opens said relay when triggered said first voltage stabilizer; and
   an automatic voltage control circuit, including a second variable resistor electrically connected to the output of said starting control circuit, a second TRIAC switch controller comprising a second voltage stabilizer and a second TRIAC, a second transformer electrically connected between said second TRIAC and said generator, a second capacitor arranged in parallel with said generator; and
   an inductive magnetic saturation regulator arranged in parallel with said generator;
   whereby said second TRIAC switch controller is arranged to induce a current to flow in said magnetic saturation regulator so that said magnetic saturation regulator shifts the generator output current phase a desired amount in accordance with the values of said second capacitor and said second variable resistor, said generator output current flowing only when said relay is opened.

2. An automatic phase controller for a non-coil armature-type generator as claimed in claim 1, wherein said automatic voltage control circuit further comprises a third TRIAC arranged to be triggered in parallel with said second TRIAC by said second voltage stabilizer, and first and second TRIAC capacitors, each electrically connected between one of said second and third TRIACs and said starting control circuit output, whereby phase control of the generator output current is achieved in both forward and reverse directions by means of the respective pulses produced by triggering the second and third TRIACs.

* * * * *